(12) United States Patent
Chalupa et al.

(10) Patent No.: US 8,245,222 B2
(45) Date of Patent: Aug. 14, 2012

(54) IMAGE INSTALLER

(75) Inventors: Andreas Chalupa, Methuen, MA (US);
Rachel Muller, Westford, MA (US);
Zhuo Yao Chen, Chestnut Hill, MA (US)

(73) Assignee: Aspect Software, Inc., Lombard, IL (US)

( * ) Notice: Subject to any disclaimer, the term of this patent is extended or adjusted under 35 U.S.C. 154(b) by 1009 days.

(21) Appl. No.: 12/170,180

(22) Filed: Jul. 9, 2008

(65) Prior Publication Data
US 2010/0011353 A1 Jan. 14, 2010

(51) Int. Cl.
*G06F 9/445* (2006.01)
(52) U.S. Cl. .......................... 717/174; 717/104; 709/222
(58) Field of Classification Search .................. 717/168, 717/174, 104; 709/222
See application file for complete search history.

(56) References Cited

U.S. PATENT DOCUMENTS

| | | | | |
|---|---|---|---|---|
| 7,788,314 | B2* | 8/2010 | Holt | 709/201 |
| 2006/0259184 | A1* | 11/2006 | Hayes et al. | 700/221 |
| 2009/0210869 | A1* | 8/2009 | Gebhart et al. | 717/174 |
| 2009/0217244 | A1* | 8/2009 | Bozak et al. | 717/124 |
| 2009/0217255 | A1* | 8/2009 | Troan | 717/168 |
| 2009/0217260 | A1* | 8/2009 | Gebhart et al. | 717/174 |
| 2009/0249283 | A1* | 10/2009 | Bourdon | 717/104 |
| 2009/0300151 | A1* | 12/2009 | Friedman et al. | 709/222 |
| 2010/0005461 | A1* | 1/2010 | Shribman et al. | 717/177 |

* cited by examiner

*Primary Examiner* — Don Wong
*Assistant Examiner* — Mohammad Kabir
(74) *Attorney, Agent, or Firm* — Husch Blackwell LLP

(57) ABSTRACT

A method, apparatus, and software are provided for deploying at least one virtual appliance to a deployment site of a multi-tier computer system. The method includes reading a deployment configuration file to identify at least one virtual appliance to deploy, transferring the identified at least one virtual appliance to the computer system, registering the at least one virtual appliance with a virtualization software of the computer system, changing the network settings of the virtualization software to match the deployment configuration file, placing a copy of the deployment configuration file on the virtualization software, and the virtualization software installing the identified at least one virtual appliance on the computer system.

39 Claims, 9 Drawing Sheets

IMAGE INSTALLER

FIELD OF INVENTION

The present invention relates generally to computers. More particularly, the present invention relates to computer programming.

BACKGROUND

Computer systems have become a virtual necessity for the operation of any relatively large organization. For financial, membership or even asset information, there is no other device capable of tracking the activities of geographically diverse organizational operations administered by different people, possibly using different languages.

A computer system used by an organization will typically be provided with a number of databases to administer and track organizational activities. For example, one database may be provided for financial information (e.g., accounts receivable, accounts payable, etc.), another database may be provided to track progress towards organizational objectives (e.g., manufactured product, raw materials, etc.) and still another database may be provided to track organization membership (e.g., human resources, etc.).

A respective server may be provided as an interface between organizational members and the organizational databases. Where the needs for different parts of the organization are different (e.g., language), then an application specific interface (API) may be used to standardize a server interface to a common format.

Due to changing business conditions or otherwise, software components and systems eventually become outdated and must be updated or replaced. While the process may be relatively simple in the case of a personal computer, the process becomes considerably more complicated in networked systems having many servers and dependent applications that rely upon those servers. Because of the importance of servers and server systems, there is a continuing, ongoing need for better methods of updating computer systems.

DESCRIPTION OF THE PREFERRED EMBODIMENTS

Figure 1:
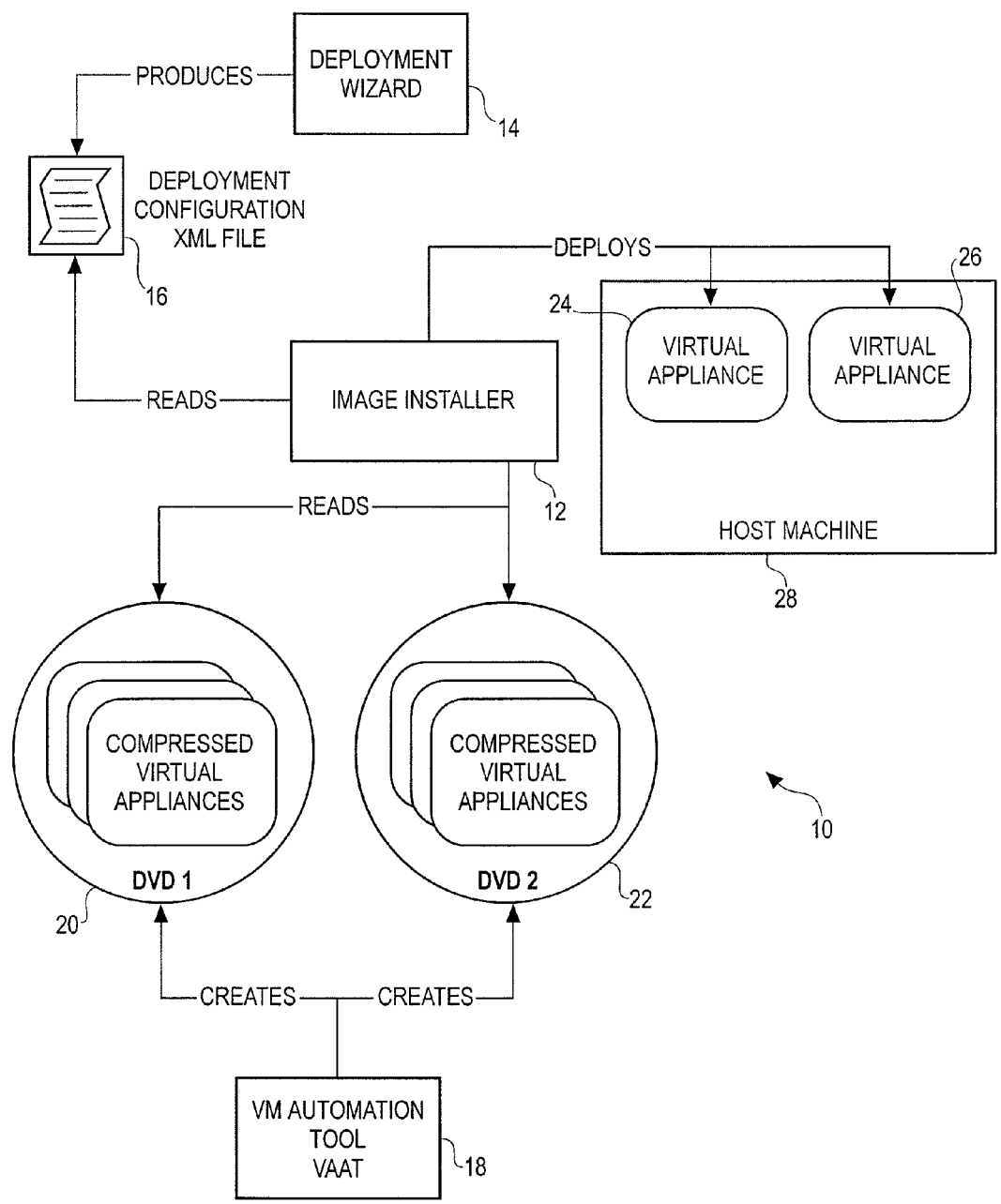
FIG. 1 depicts a computer system for deploying software at a customer's site in accordance with an illustrated embodiment of the present invention.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments of the present invention include a computer system for deploying software at a customer's site in accordance with illustrated embodiments of the present invention. The software system may be used in a broad range of computing applications and environments. While the system may have application to many different computer systems, the software loading system may be of particular value in the case of a computer system with many servers such as an automatic call distribution system. It should be understood that the system can be used in virtually any multi-tier computer system. As used herein, a multi-tier computer system is a computer system with a multitude of inter-dependent servers.

When multi-tier software systems must be updated, software suppliers will often build a software tool referred to as a software or application installer. An application installer is a custom application that is loaded onto a computer and that installs software applications on top of preexisting software applications that had previously been set up by IT personnel responsible for the computer system.

A variation of an application installer is a software or virtual appliance. A virtual appliance differs from an application installer in that it is provided with its own operating system environment. A virtual appliance, as with the application installer, is self-contained in the sense that it is oblivious to the environment in which it is installed.

In the past, the use of pre-built software installers or virtual appliances has often produced unpredictable results since it was likely that the software product to be installed had not been fully tested in the intended environment. For example, the end user may have very different IT security, network and machine setup standards than that of the software developer. Products successfully tested by the software developer often did not work as expected once deployed into the customer's environment due to different preexisting conditions (e.g., security policies, network settings, additional software, etc.).

In addition, many pre-built software installers or virtual appliances often require the input of information for each and every machine on which the software is to be installed. The requirement for additional information often causes input errors and can lead to misconfigured deployments where consistent information is not provided.

To address these problems, a system in accordance with the present invention provides an interface that collects information about the specific environment of deployment within the destination system. Processing features within the system process the collected information to produce an interface profile that allows a software system with a number of servers to be properly configured and deployed with a minimum of or no user interaction.

A software installation system can include at least three components: a virtual appliance automation tool (VAAT), a deployment wizard (DW), and an image installer (II). In general, the software installation system is provided by a software developer for use by an organization in automatically installing software within a computer system. The VAAT may reside on a host operated by the software developer while the deployment wizard and image installer may exist in the form of CDs or files transferred between the host of the software developer and host of the organization.

Turning now to FIG. 1, the image installer 12 can be used to deploy virtual appliances at a customer site. A user can run a deployment wizard 14, which can produce a deployment configuration XML file 16 based upon the destination environment. While running the deployment wizard 14, the user can determine which virtual appliances are to be deployed.

The image installer 12 can read the deployment configuration XML file 16 to determine which virtual appliances or images need to be deployed on the current destination machine. The VAAT 18 can create a Virtual Appliance Index that lists which DVD 20 or 22 or other computer medium contains which virtual appliance. The image installer 12 can look to the Virtual Appliance Index to determine which DVD 20 or 22 contains the virtual appliances 24, 26 that are to be deployed. The image installer 12 can then prompt the proper DVD 20 or 22 for the virtual appliances 24, 26 that are to be deployed and deploy the virtual appliances 24, 26 to the host machine 28. Once a virtual appliance 24, for example, is deployed, the network settings and machine name of the virtual appliance 24 deployed can be changed.

In embodiments of the claimed invention, virtual appliances can be deployed in an operating system that employs virtualization software. For example, virtual appliances can be deployed in a high end VMWare ESX operating system. VMWare (Virtual Machine Software) is a company that develops proprietary virtualization software products, and ESX is an enterprise-level software that runs directly on server hardware without requiring an additional underlying operating system. In further embodiments, virtual appliances can be deployed into a host operating system that runs Windows or Linux. In embodiments where Windows or Linux is employed, an image installer can be used for internal testing only.

While operating within the system 10, the image installer 12 can have several responsibilities. First, the image installer can provide a user interface (UI) installer that can be run on diverse host operating systems. For example, and as discussed above, the UI installer can run on Windows, Linux, and VMWare ESX. As will be explained herein, when the UI installer runs on VMWare ESX, the system can use a console interface because ESX does not have a windowing environment. Therefore, the image installer can provide a console interface that can be used on operating systems that don't have windowing environments.

The image installer can provide three basic modes of operation: install mode, modify mode, and uninstall mode. Each mode of operation will be discussed in further detail herein.

If the host system is running on a Linux or Windows operating system, the image installer can give the option to silently install a VMWare server. If a VMWare server is already present in the system, the image installer can give the option to use the existing VMWare server.

Before operation, the image installer can perform several prerequisite checks. First, the image installer can verify that a proper operating system version is running. Next, the image installer can determine that the host machine has enough physical memory to handle the virtual appliances that are to be deployed onto that system. Finally, the image installer can verify that the host machine has enough CPU Cores to handle the virtual appliances that are to be deployed on that system.

The image installer can reassemble virtual appliances that are deployed onto various DVDs or other computer medium. Specifically, the image installer can combine, for example, split 500 MB files into a single file, uncompress the combined file, and extract the uncompressed file into several virtual appliance files.

The image installer can deploy virtual appliances to a host operating system and coordinate with a virtual appliance script running in the virtual appliance and the virtualization software on the host machine to change the network settings of the deployed virtual appliance. Further, the image installer can coordinate with virtualization software to copy the deployment configuration file to a deployed virtual appliance. The image installer can read the deployment configuration XML and virtual appliance index XML files to determine which virtual appliances to deploy and from which DVD to pull the virtual appliance. Finally, the image installer can prompt a user to insert the appropriate DVD when deploying virtual appliances.

As described above, the image installer can support three installation modes: install, modify, and uninstall. In the event that a virtual appliance must be re-deployed, this can be done using the image installer via two operations: an uninstall operation followed by an install operation.

During the install mode, the image installer can deploy new virtual appliances to a host machine. Specifically, the image installer can read the deployment configuration XML file to determine which virtual appliances are to be deployed onto the host machine. The image installer can then read the virtual appliance index XML file to determine from which DVD to pull to pull the virtual appliance. The virtual appliance files are then transferred to the host operating system.

Once transferred to the host operating system, the virtual appliance can be registered with virtualization software, and the virtual appliance is started. When the virtual appliance starts up, the image installer can communicate with a virtual appliance script to change the network settings (e.g., administrative password, setting to use DHCP) and machine name of the virtual appliance to match the data provided in the deployment configuration file. The image installer can also use the virtualization software to place a copy of the deployment configuration file on the virtual appliance.

Once the network settings are changed, the image installer can be activated to read the deployment configuration file. The image installer can use the data from the deployment configuration file to complete the installation and configuration of the virtual appliance. The image installer can use the host names and IP addresses that are not known at the time the virtual appliance is created to complete the configuration of the software on the deployed virtual appliance.

After a first virtual appliance is employed, a user can use the same process to deploy any number of virtual appliances that are to be installed on the host machine. In embodiments of the present invention where the host operating system is Windows or Linux as opposed to ESX, the image installer can silently support installing the virtualization software if it cannot be found during the install mode.

During the modify mode, the image installer can compare the original deployment configuration file with a modified version of the deployment configuration file. The image installer can note any virtual appliances that are being added to or removed from the current host machine. For each removed virtual appliance, the image installer can unregister the virtual appliance with the virtualization software and delete the virtual machine from the disk. For each added virtual appliance, the image installer can follow the procedure described above with respect to the install mode to deploy the new virtual appliance.

During the uninstall mode, the image installer can completely uninstall any deployed virtual appliances. Specifically, the image installer can stop the virtual appliances, unregister the virtual appliances from the virtualization software, and delete all of the virtual appliance files from the disk. The image installer can remove all of the virtual appliances that it has deployed.

In embodiments of the claimed invention where the host operating system is Windows or Linux, the image installer will not uninstall the virtualization software. The virtualization software can be uninstalled from Windows or Linux using Add/Remove programs native to Windows or Linux.

With respect to the deployment configuration file, which is produced by the deployment wizard, the deployment configuration file can contain configuration information for the system. Additionally, the deployment configuration file can be used by the image installer to perform at least the following tasks: checksum verification, host name verification, and virtual appliance configuration.

The checksum verification task includes the image installer determining if a selected file is valid. Specifically, the checksum verification task includes summing the ASCII value of all characters found in the deployment configuration file and comparing that value with the value of the image installer's internal calculation of the value. If the values are the same, the installation process can proceed. If the values are not the same, the image installer can prevent the user from proceeding.

The host name verification task includes the image installer running a search in the deployment configuration XML file to find a name that matches the name of the local host machine. If the name of the host machine is found in the XML file, then the image installer can determine which virtual appliances are to be deployed onto the host. If the name of the host machine is not found in the XML file, an error can be displayed to the user. In this event, the user cannot proceed with installation.

The virtual appliance configuration task can be carried out if the name of the host machine is found in the XML file. In this event, the image installer can obtain at least the following information from the deployment configuration XML file: the file name and directory name of the virtual appliance image to be deployed, the machine name to be changed to on the virtual appliance, the administrative password to be used on the virtual appliance, and a setting to change network settings to use dynamic host configuration protocol (DHCP) on the virtual appliance. If DHCP is not enabled, then the image installer can obtain the following additional information from the XML file: the IP address to use on the virtual appliance, the subnet mask to use on the virtual appliance, the default gateway to use on the virtual appliance, the domain name system (DNS) to use on the virtual appliance; and optional DNS to use on the virtual appliance. The image installer can use this information obtained from the XML file to set the machine name and network settings when deploying the virtual appliance.

In embodiments of the present invention, a Macrovision InstallAnywhere tool can be used to build the install project for the image installer. This approach has several advantages over a manual install process. First, the InstallAnywhere tool can build install projects that can work in either a GUI or console mode depending on the environment where it is invoked. Accordingly, a user-friendly interface for live users can be provided as well as a means of running the installer in an automated way for silent installs. Second, the InstallAnywhere tool has multiplatform capabilities. In this regard, a single installer can be built that can run on Windows, Linux, or VMWare ESX host operating systems.

Figure 2:
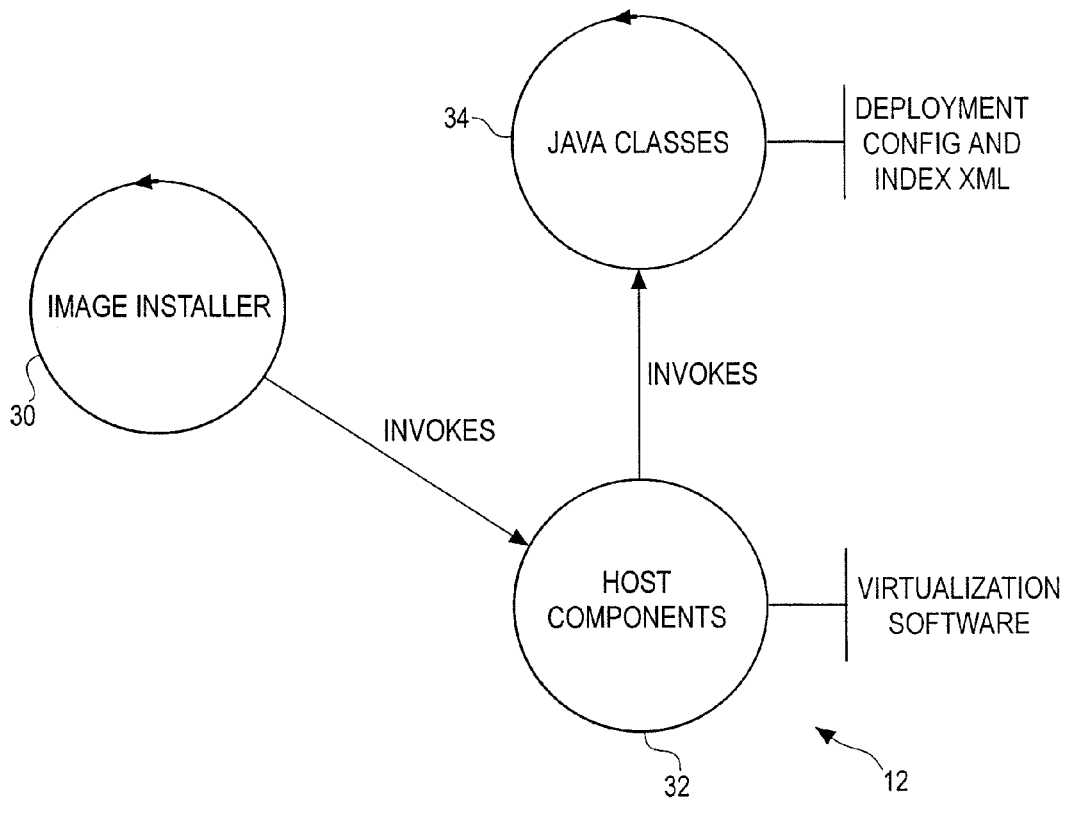
FIG. 2 depicts an analysis model of the objects constituting an image installer in accordance with an illustrated embodiment of the present invention.

Turning now to FIG. 2, the image installer 12 can include at least three objects: an image installer object 30, host components 32, and Java classes 34.

In FIG. 2, the image installer object 30 represents the InstallAnywhere installer project. The image installer object 30 can be the main control object for the image installer 12. The image installer object 30 can provide the user interface, both GUI and console, for the image installer 12. Further, the image installer object 30 can provide the basic functionality for checking prerequisites, installing files, and performing silent installs. The image installer object 30 can control the flow of the installation process and, based on conditions, determine if and what actions to run during the install.

The host components 32 can include installers, tools, and scripts that are invoked on the host operating system. Host components 32 can include, for example, installers for silently installing a VMWare server, GNU tools for uncompressing virtual appliance images, and Perl scripts that are used to interact with virtualization software. The host 32 components will be described in further detail herein.

The InstallAnywhere tool can provide interface hooks for running Java code during the installation process. The Java code can perform the complicated tasks that can't be done natively in the InstallAnywhere tool, including, for example, reading XML files, prompting a user for console input, and validating console input. The Java classes 34 will be described in further detail herein The external interface of the image installer in accordance with the present invention includes a user interface that asks for user inputs. In embodiments of the present invention, the user interface can be a GUI. In alternate embodiments, the user interface can be a console interface.

An exemplary series of interactive windows displayed on a GUI of the image installer during the install mode is shown in FIGS. 3-7. Those of skill in the art will understand that the displayed windows may include additional or alternate windows than those depicted in FIGS. 3-7. Those of skill in the art will further understand that interactive windows for the modify and uninstall modes come within the spirit and scope of the present invention and are in accordance with the windows depicted in FIGS. 3-7.

Figure 3:
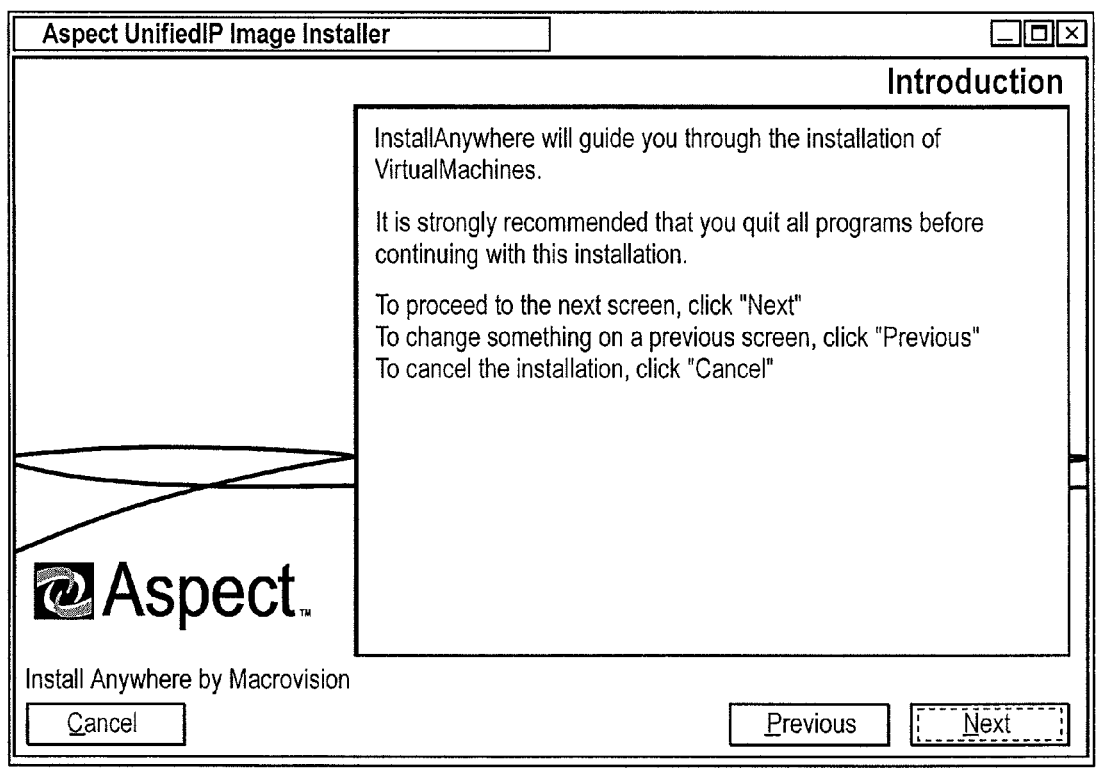
FIG. 3 depicts an interactive window displayed on a screen of a computer for welcoming a user to an install mode of the image installer.

FIG. 3 depicts a window welcoming a user to an install mode of the image installer. The welcome window is shown first.

Figure 4:
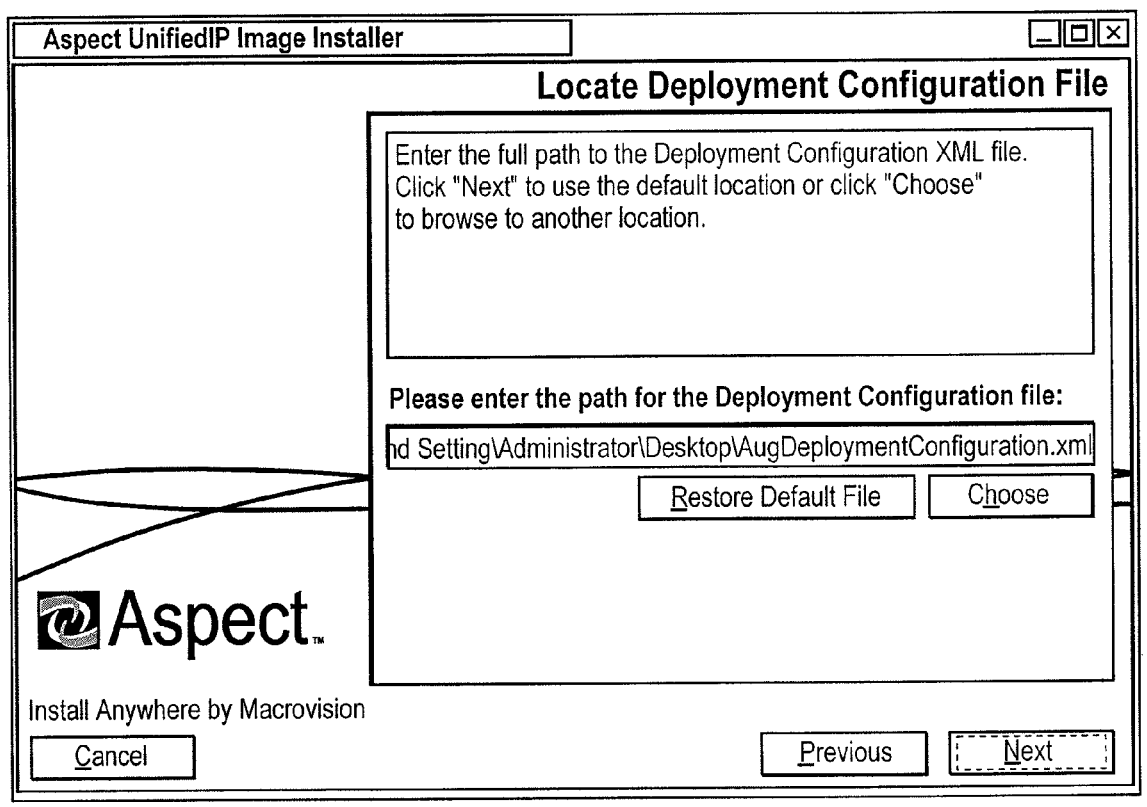
FIG. 4 depicts an interactive window displayed on a screen of a computer for identifying a configuration file.

FIG. 4 depicts a window for identifying a configuration file. A user can browse to a deployment configuration file. When the user selects a deployment configuration file, the image installer can perform the checksum verification and host name verification tasks as described above. That is, the image installer can analyze the selected deployment configuration file to determine if the checksum of the selected file is valid and to determine if the name of the local host machine is listed in the deployment configuration file. If errors are encountered, a popup dialog can be shown. In this event, a user is not allowed to proceed with the installation.

Figure 5:
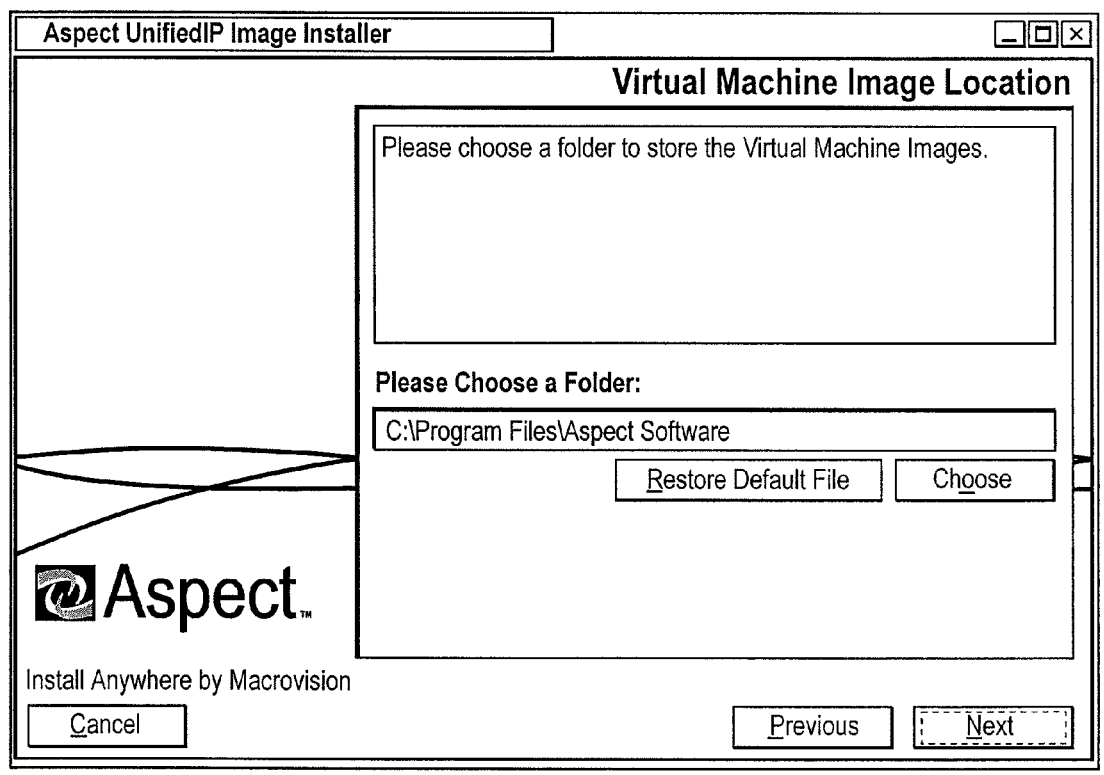
FIG. 5 depicts an interactive window displayed on a screen of a computer for identifying a directory in which to install deployed software.

FIG. 5 depicts a window for identifying a directory in which to install deployed software. A user can browse to a directory in which he or she wants to install the virtual appliance(s). The image installer can place each virtual appliance that is being deployed onto the local host machine into its own directory under the directory selected by the user. A user cannot proceed if an invalid directory is selected.

Figure 6:
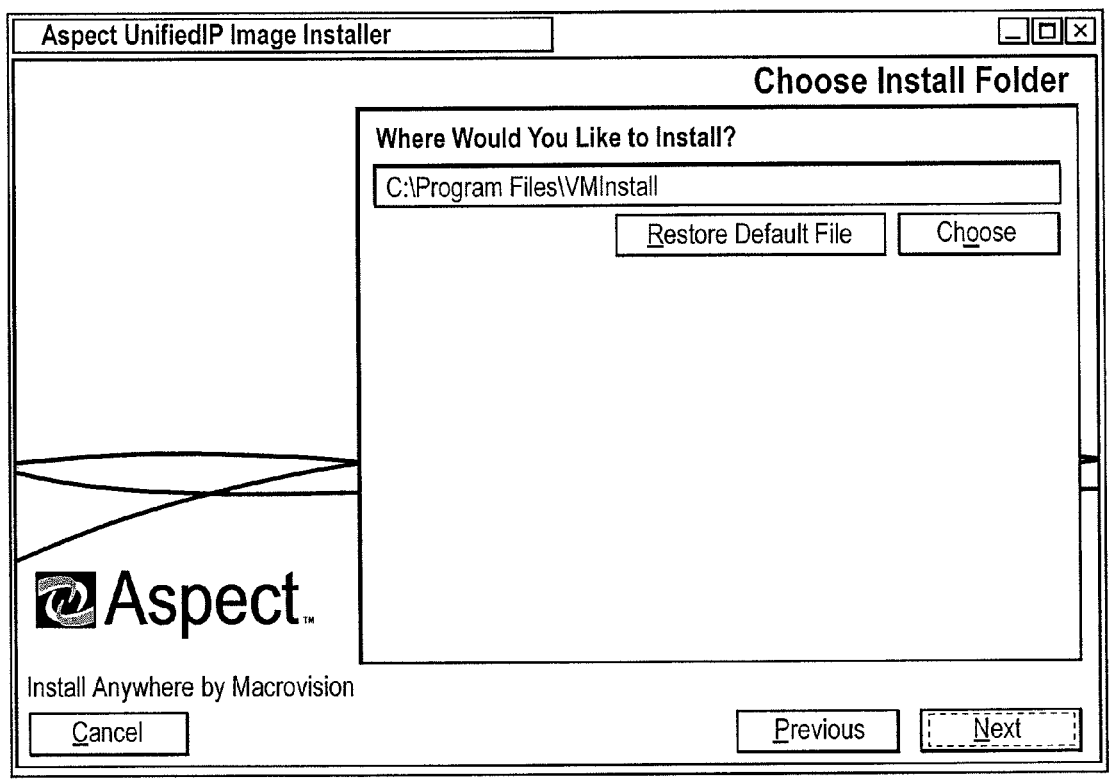
FIG. 6 depicts an interactive window displayed on a screen of a computer for identifying a location on a disk in which to install support files.

FIG. 6 depicts a window for identifying a location on a disk in which to install support files. The support files, including the deployment configuration file, must be installed on a disk. A user can browse to a location on the disk in which to install the support files.

Figure 7:
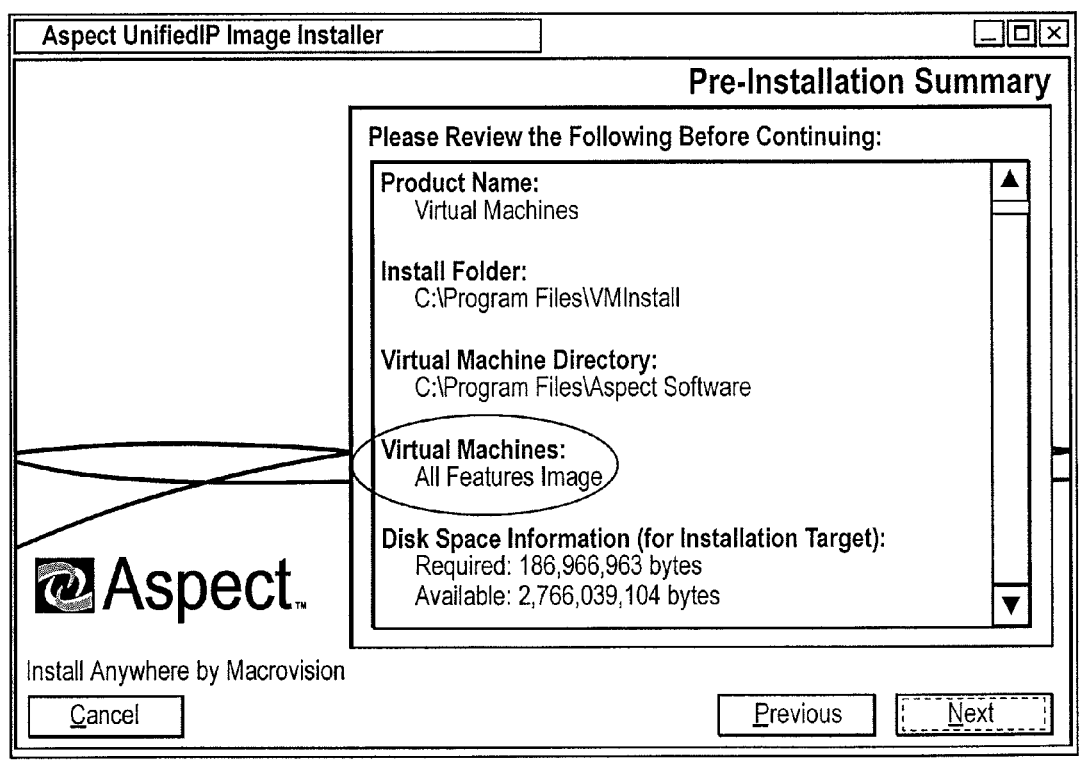
FIG. 7 depicts an interactive window displayed on a screen of a computer showing a summary of data entered during the install mode.

FIG. 7 depicts a window showing a summary of data entered during the install mode. The summary window is the last shown. The information shown in the summary window can include, for example, a list of virtual appliance or images that are to be deployed onto the local host machine.

An exemplary series of interactive screens displayed on a console interface of the image installer during the install mode is shown in FIGS. 8-12. Those of skill in the art will understand that the displayed screens may include additional or alternate screens than those depicted in FIGS. 8-12. Those of skill in the art will further understand that interactive screens for the modify and uninstall modes come within the spirit and scope of the present invention and are in accordance with the screens depicted in FIGS. 8-12.

The console interface can capture the same information captured in the GUI as described above. To start the image installer in console mode, a user can use a "-i console" command line. Console mode can be used on VMWare ESX, which does not include a windowing environment. Console mode can also be used on Windows or Linux host operating systems.

Figure 8:
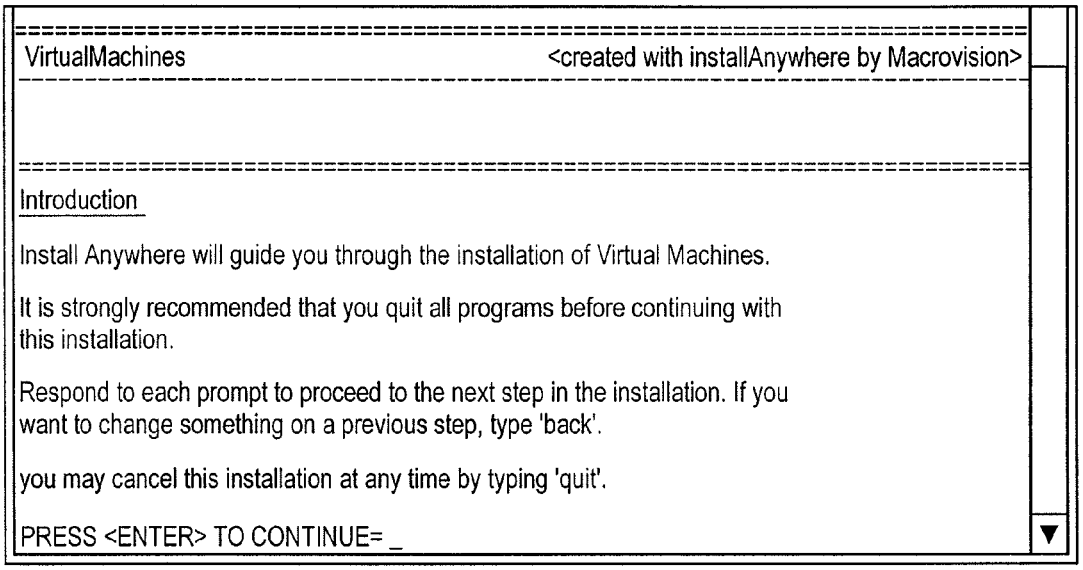
FIG. 8 depicts an interactive screen of a computer for welcoming a user to an install mode of the image installer.

FIG. 8 depicts a screen welcoming a user to an install mode of the image installer in console mode. The welcome screen is shown first.

Figure 9:
FIG. 9 depicts an interactive screen of a computer for identifying a configuration file.

FIG. 9 depicts a screen for identifying a configuration file. The configuration identifying screen can display a default location in which a deployment configuration file may be located. The user can enter an alternate location or accept the default location. When the user selects the location of the deployment configuration file, the image installer can perform the checksum verification and host name verification tasks as described above.

Figure 10:
FIG. 10 depicts an interactive screen of a computer for identifying a directory in which to install deployed software.

FIG. 10 depicts a screen for identifying a directory in which to install deployed software. The directory identifying screen can display a default location in which to install the virtual appliance(s). The user can enter an alternate location or accept the default location. The image installer can place each virtual appliance that is being deployed onto the local host machine into its own directory under the directory selected by the user. A user cannot proceed if an invalid directory is selected.

Figure 11:
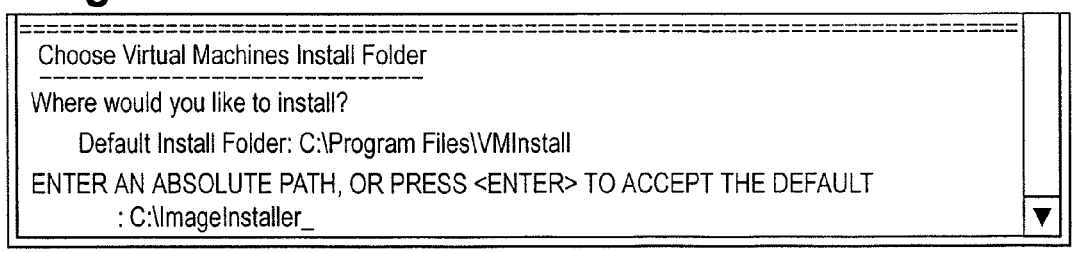
FIG. 11 depicts an interactive screen of a computer for identifying a location on a disk in which to install support files.

FIG. 11 depicts a screen for identifying a location on a disk in which to install support files. The location identifying screen can display a default location in which to install the support files. The user can enter an alternate location or accept the default location.

Figure 12:
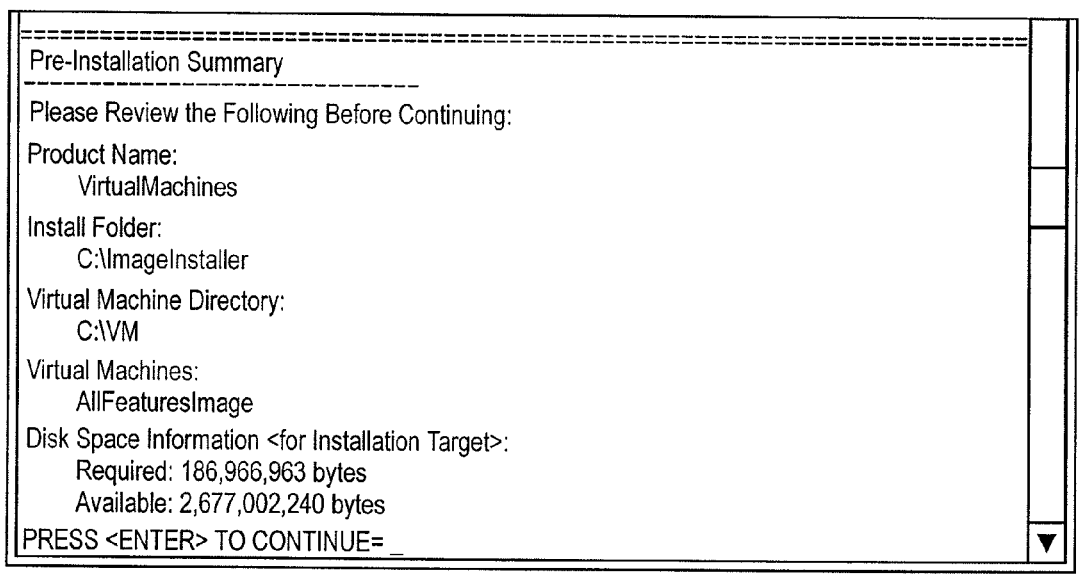
FIG. 12 depicts an interactive screen of a computer showing a summary of data entered during the Install Mode.

FIG. 12 depicts a screen showing a summary of data entered during the install mode. The summary screen is the last shown.

A threading model for the image installer as would be understood by those of skill can be created and managed by the InstallAnywhere tool. All installation operations can be performed on a single thread. Further, the thread can be created when the image installer is started from the XML configuration file and can terminate when the image installer completes. The lifecycle of the thread can exist whether the image installer is running in GUI mode, console mode, or silent mode.

With respect to the java classes included in the image installer, custom code components, which are part of the InstallAnywhere tool, can be written in Java and can be used to perform complicated tasks that can't be completed in the InstallAnywhere tool. The custom code components can gather information and monitor the progress of the installation process.

The Java custom code can be built by extending a CustomCodeAction interface. This interface defines two methods: install and uninstall, that can be overridden. The InstallAnywhere tool can call either the install or uninstall method depending on what type of operation is being done. Various exemplary types of Java custom code in accordance with the present invention will now be described herein.

ConsoleInput Java custom code, for example, can be used to gather user information from a console prompt. This class can be used to obtain the path to the deployment configuration XML file and to obtain the location in which to store virtual appliance images, as described above.

GetOSProperties Java custom code, for example, can be used to gather system information. This class can be used to obtain the name of the local host machine and operating system used.

XMLCheck Java custom code, for example, can check the deployment configuration file for a checksum value, as described above. The checksum value can be stored in an InstallAnywhere variable. This code can also search the deployment configuration file for the name of the local host machine and indicate whether the name was found.

CheckSumRule Java custom code, for example, can validate the deployment configuration file checksum, described above. CheckSumRule can compare the CheckSum value with its own calculation of the value. If the two values are the same, the comparison succeeds. If the two values are not the same, the comparison fails, and an error message can be displayed.

PerformXPathQuery Java custom code, for example, can gather virtual appliance configuration information from the deployment configuration XML file. The code can copy the appropriate virtual appliance image to the appropriate destination on a local disk, set any permissions that are needed, and pass the configuration information to a respective Perl script.

PerformXPathQueryConsole, for example, is the console version of the PerformXPathQuery script. In addition to the functionalities described above, the PerformXPathQueryConsole Java custom code can perform a cloning function for ESX virtual appliance images in lieu of copying the images.

A Common object, for example, can contain data classes for VMImage and VMImageList.

A JDPAPI object, for example, can be used to decrypt passwords within the image installer. This object can be used when setting an administrator's password inside a deployed virtual appliance, for example.

A ModifyImages object, for example, can be called during the uninstall mode. The ModifyImages object can compare the images in the existing deployment with the images in a new deployment file and make any adjustments necessary. In embodiments of the present invention, this object can run quickly so unnecessary lag time is not experienced in the installer. A ModifyImagesConsole is the console version of the ModifyImages object.

Finally, a RemoveImages object, for example, can be used during the uninstall mode to find and remove all installed images.

With respect to the host components included in the image installer, the host components can be installed by the image installer on a local disk. These components can aide in preparing the VMware-server and corresponding virtual appliance images. Various types of exemplary host components in accordance with the present invention will now be described herein.

A VMware Server Windows Installer Package, for example, can contain software to run virtual appliance images. If not already installed on a host operating system, this component can be installed silently by the image installer.

A VMware vmPerl API Windows Installer Package, for example, can contain API to send and receive information to and from the guest operating system. If not already installed on the host operating system, this component can be installed silently by the image installer.

A VMware RPM Package Manager, for example, can contain software to run virtual appliance images. This component can also contain the VMware vmPerl Scripting API component. If not already installed on the host operating system, the WMware RPM Package Manager can be installed silently by the image installer.

A post VMware-server installation script for Red Hat Linux, for example, can set up the default configuration and license without any prompts.

The deployment configuration XML file can be packaged into an ISO file, for example, and mounted as a CD on the guest operating system. This utility can give the guest operating system the ability to access the XML file.

A utility to uncompress the virtual appliance images from a CD or DVD can result in a file that is a tar ball. A utility to uncompact the tar ball can result in consumable virtual appliance image files.

A Merge Perl Scripts component, for example, can be used as the main scripts to deploy a virtual appliance and can include several steps. First, split image files from the DVDs can be merged into a single file. Then, the merged file can be uncompressed following by untarring the uncompressed file to install the virtual appliance to its final destination on the host machine. Then, a deployment configuration ISO file can be mounted inside of the virtual appliance so the deployment configuration file can be seen inside the virtual appliance. The deployment configuration file can be mounted as a CD ROM. The virtual appliance can be registered, started, and receive network settings. Next, the virtual appliance script can change network settings, machine name, and an administrator password. The virtual appliance script can shut down the virtual appliance, and the CD ROM drive on the virtual appliance can be reconfigured to point back to the physical CD drive.

Finally, a Remove Perl Scripts component can be used to remove a virtual appliance. This component can stop the virtual appliance if it is running, unregister the virtual appliance from the virtualization software, and delete all of the virtual appliance files.

From the foregoing, it will be observed that numerous variations and modifications may be effected without departing from the spirit and scope of the invention. It is to be understood that no limitation with respect to the specific apparatus or method illustrated herein is intended or should be inferred. It is, of course, intended to cover by the appended claims all such modifications as fall within the scope of the claims.

What is claimed is:

1. A method of deploying at least one virtual appliance to a deployment site of a multi-tier computer system comprising:
    reading a deployment configuration file to identify at least one virtual appliance to deploy;
    retrieving the identified at least one virtual appliance from at least two locations, the at least two locations containing at least one file at each location, the at least one file at each location containing a portion of the virtual appliance;
    transferring the identified at least one virtual appliance to the computer system;
    registering the at least one virtual appliance with a virtualization software of the computer system;
    changing network settings of the virtualization software to match the deployment configuration file;
    placing a copy of the deployment configuration file on the virtualization software; and
    the virtualization software installing the identified at least one virtual appliance on the computer system.

2. A method as in claim 1 further comprising the deployment configuration file containing a name of the at least one virtual appliance.

3. A method as in claim 1 further comprising reading a virtual appliance index wherein the virtual appliance index identifies a location of the least one virtual appliance.

4. A method as in claim 1 occurring on one of a VMWare ESX operating system, or a Windows operating system.

5. A method as in claim 1 further comprising retrieving the identified at least one virtual appliance from at least one location.

6. A method as in claim 1 further comprising reassembling the at least one virtual appliance from the at least one file at each location.

7. A method as in claim 6 further comprising uncompressing the reassembled virtual appliance.

8. A method as in claim 1 further comprising verifying a proper operating system version is running.

9. A method as in claim 8 further comprising determining an amount of available memory, and an amount of CPU cores on the computer system at the deployment site are sufficient to handle the at least one virtual appliance to be deployed onto the computer system.

10. A method as in claim 1 further comprising providing a user interface.

11. A method as in claim 10 wherein the user interface is one of a graphical user interface or a console interface.

12. A method as in claim 10 wherein the user interface is capable of displaying a screen or window for identifying the deployment configuration file, a screen or window for identifying a directory in which to install the at least one virtual appliance, and a screen or window for identifying a location in which to install the deployment configuration file.

13. A method as in claim 1 performed on a single thread.

14. An apparatus for deploying at least one virtual appliance to a deployment site of a multi-tier computer system comprising:
    means for reading a deployment configuration file to identify the at least one virtual appliance to deploy;
    means for retrieving the identified at least one virtual appliance from at least two locations, the at least two locations containing at least one file at each location, the at least one file at each location containing a portion of the virtual appliance;
    means for transferring the identified at least one virtual appliance to the computer system;
    means for registering the at least one virtual appliance with a virtualization software of the computer system;
    means for changing the-network settings of the virtualization software to match the deployment configuration file;
    means for placing a copy of the deployment configuration file on the virtualization software; and means for the virtualization software installing the identified at least one virtual appliance on the computer system.

15. An apparatus as in claim 14 further comprising means for the deployment configuration file containing a name of the at least one virtual appliance.

16. An apparatus as in claim 14 further comprising a virtual appliance index and means for the virtual appliance index identifying a location of the at least one virtual appliance.

17. An apparatus as in claim 14 further comprising means for operating on one of a VMWare ESX operating system, or a Windows operating system.

18. An apparatus as in claim 14 further comprising means for retrieving the at least one virtual appliance from at least one location.

19. An apparatus as in claim 14 further comprising means for reassembling the at least one virtual appliance from the at least one file at each location.

20. An apparatus as in claim 19 further comprising means for uncompressing the reassembled virtual appliance.

21. An apparatus as in claim 14 further comprising means for verifying a proper operating system version is running.

22. An apparatus as in claim 14 further comprising means for determining an amount of available memory on the computer system at the deployment site.

23. An apparatus as in claim 14 further comprising means for providing a user interface.

24. An apparatus as in claim 23 wherein the user interface is one of a graphical user interface or a console interface.

25. An apparatus as in claim 23 wherein the user interface comprises means for displaying a screen or window for identifying the deployment configuration file, a screen or window for identifying a directory in which to install the at least one virtual appliance, and a screen or window for identifying a location in which to install the deployment configuration file.

26. An apparatus as in claim 14 further comprising means for deploying the at least one virtual appliance to the deployment site on a single thread.

27. Software stored in a computer-readable medium for deploying at least one virtual appliance to a deployment site of a multi-tier computer system comprising:
   instructions for reading a deployment configuration file to identify the at least one virtual appliance to deploy;
   instruction for retrieving the identified at least one virtual appliance from at least two locations, the at least two locations containing at least one file at each location, the at least one file at each location containing a portion of the virtual appliance;
   instructions for transferring the identified at least one virtual appliance to the computer system;
   instructions for registering the at least one virtual appliance with a verbalization software of the computer system;
   instructions for changing the-network settings of the virtualization software to match the deployment configuration file,
   instructions for placing a copy of the deployment configuration file on the virtualization software; and
   instructions for the virtualization software to install the identified at least one virtual appliance on the computer system.

28. Software as in claim 27 wherein the deployment configuration file contains a name of the at least one virtual appliance.

29. Software as in claim 27 further comprising instructions for reading a virtual appliance index to identify a location of the at least one virtual appliance.

30. Software as in claim 27 operating on one of a VMWare ESX operating system, a Windows operating system, or a Linux operating system.

31. Software as in claim 27 further comprising instructions for retrieving the at least one virtual appliance from at least one location.

32. Software as in claim 27 further comprising instructions for reassembling the at least one virtual appliance from the at least one file at each location.

33. Software as m claim 32 further comprising instructions for uncompressing the reassembled virtual appliance.

34. Software as in claim 27 further comprising instructions for verifying a proper operating system is running.

35. Software as in claim 27 further comprising instructions for determining an amount of available memory on the computer system at the deployment site.

36. Software as in claim 27 further comprising instructions for providing a user interface.

37. Software as in claim 36 wherein the user interface is one of a graphical user interface or a console interface.

38. Software as m claim 36 wherein the user interface comprises a screen or window for identifying the deployment configuration file, a screen or window for identifying directory in which to install the at least one virtual appliance, and a screen or window for identifying a location in which to install the deployment configuration file.

39. Software as in claim 27 further comprising instructions for deploying the at least one virtual appliance to the deployment site on a single thread.

* * * * *